United States Patent [19]

Albrecht et al.

[11] Patent Number: 5,555,069
[45] Date of Patent: Sep. 10, 1996

[54] CAMERA WITH ELECTROCHROMIC FILTER

[75] Inventors: Richard E. Albrecht, Honeoye Falls; David R. Dowe, Holley, both of N.Y.

[73] Assignee: Eastman Kodak Company, Rochester, N.Y.

[21] Appl. No.: 395,746

[22] Filed: Feb. 28, 1995

[51] Int. Cl.$^6$ ........................................ G03B 7/08
[52] U.S. Cl. .................................................. 354/410
[58] Field of Search ........................ 354/227.1, 271.1, 354/410

[56] References Cited

U.S. PATENT DOCUMENTS

| | | | |
|---|---|---|---|
| 3,476,029 | 11/1969 | Schreckendgust | 95/53 |
| 4,054,890 | 10/1977 | Shimomura | 354/227 |
| 4,218,120 | 8/1980 | Kawamura et al. | 354/227 |
| 4,372,657 | 2/1983 | Iwata et al. | 354/53 |
| 4,475,803 | 10/1984 | Katsuma et al. | 354/481 |
| 4,480,269 | 10/1984 | Yoshida et al. | 358/209 |
| 4,526,454 | 7/1985 | Suzuki et al. | 354/227.1 |
| 4,554,587 | 11/1985 | Ooi et al. | 358/228 |
| 4,591,253 | 5/1986 | Hecker et al. | 354/227.1 |
| 4,804,992 | 2/1989 | Moriyama et al. | 354/471 |

OTHER PUBLICATIONS

IEEE Circuits and Devices, Mar. 1992, pp. 21 and 22.

*Primary Examiner*—W. B. Perkey
*Attorney, Agent, or Firm*—David A. Howley

[57] ABSTRACT

A camera includes means for supporting an imaging element for recording a scene, an electrochromic filter disposed between the scene and the imaging element and a photoelectric element which emits electrical energy the value of which depends on an amount of scene light which is incident on the photoelectric element. At least a portion of the electrical energy emitted by the photoelectric element is used to directly control the optical density of the electrochromic filter, thereby controlling the amount of scene light which reaches the imaging element.

4 Claims, 2 Drawing Sheets

CAMERA WITH ELECTROCHROMIC FILTER

FIELD OF THE INVENTION

The invention relates generally to the field of photography, and in particular to cameras. More specifically, the invention relates to a camera having an electrochromic filter.

BACKGROUND OF THE INVENTION

Single-use cameras have become very popular and, as a result, there is a need to increase the range of acceptable film exposure. Because this type of camera is very cost-sensitive, most camera manufacturers do not include an automatic means for controlling film exposure. Currently, most single-use cameras on the market rely on the latitude of the film to handle scenes that have different exposure needs. This can lead to poor quality pictures and dissatisfied customers. It has been proposed to use a liquid crystal filter to automatically control the film exposure in a camera. However, a liquid crystal filter uses polarizing filters in their construction. This places a severe limit on the maximum transmission of the filter. That limit will also reduce the performance of the camera in low light conditions.

U.S. Pat. No. 4,554,587 (the '587 patent) discloses a video camera including a pickup tube, a diaphragm mechanism and an electrochromic filter plate which are disposed along the optical path of incident image light on the pickup tube. When an illuminance of an object to be photographed is lower than a predetermined illuminance, only the diaphragm mechanism is used to suitably control an exposure of the pickup tube. When the illuminance of the object exceeds the predetermined illuminance level, the diaphragm mechanism is operated to keep its aperture size at a predetermined aperture size which is larger than an original minimum aperture size corresponding to a pinhole state. At the same time, the electrochromic filter plate continuously changes its light transmissivity in response to an aperture control signal, thereby controlling the exposure of the pickup tube.

A problem with the disclosure in the '587 patent is that an electrical power source, such as a battery, will be required to supply the voltage necessary to control the electrochromic filter plate 16. The necessity of a battery increases the expense of the disclosed apparatus and decreases the reliability (the battery may run out of power). A further problem with the '587 disclosure is the complexity of the control device which includes a preamplifier 20, a processing circuit, a smoothing circuit, two reference voltage generators, a differential amplifier 36, a voltage comparator 46 and an analog switch 44. Such complexity increases the cost and size of such a device.

SUMMARY OF THE INVENTION

The present invention is directed to overcoming one or more of the problems set forth above. Briefly summarized, according to one aspect of the present invention, a camera includes means for supporting an imaging element for recording a scene, an electrochromic filter disposed between the scene and the imaging element and a photoelectric element which emits electrical energy the value of which depends on an amount of scene light which is incident on the photoelectric element. At least a portion of the electrical energy emitted by the photoelectric element is used to directly control the optical density of the electrochromic filter, thereby controlling the amount of scene light which reaches the imaging element.

By using a photoelectric element to directly control the optical density of the electrochromic filter, the necessity of a battery to supply a control voltage is eliminated. As such, the size and cost of the camera can be reduced while providing exposure control in a single-use camera or inexpensive multi-use camera. In addition, the present invention uses a small number of components which further assists in size and cost reduction.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
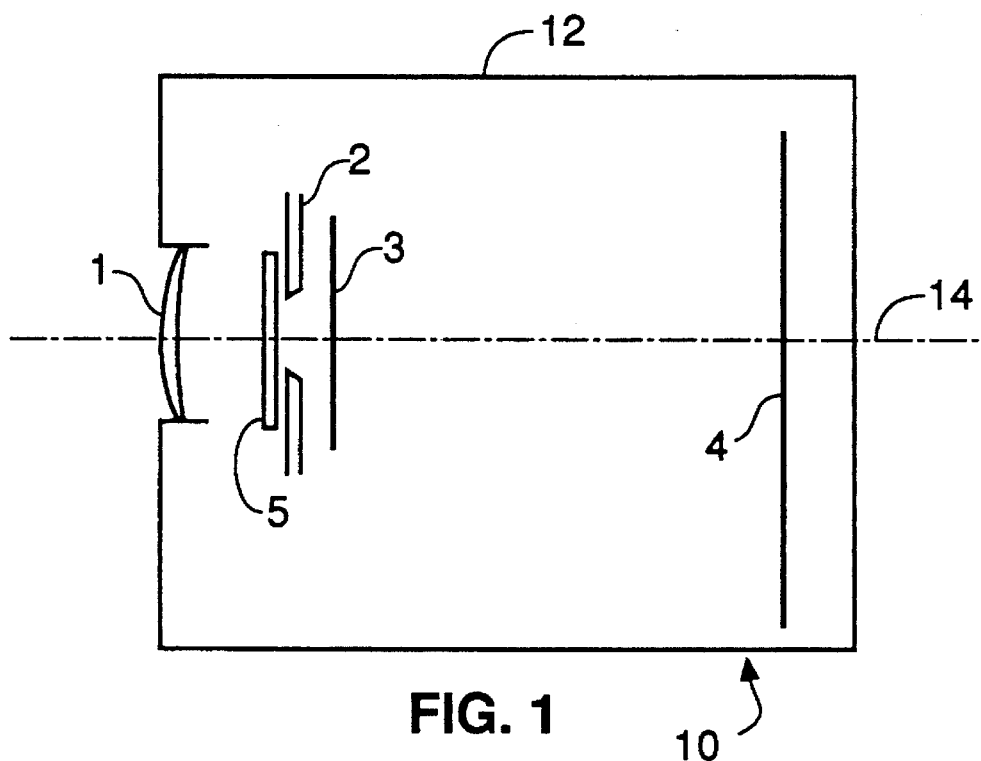
FIG. 1 is a side schematic view of a camera incorporating an electrochromic filter.

Beginning with FIG. 1, a camera 10 includes a camera body 12, an objective lens 1, an aperture stop 2, a shutter 3 and an imaging element 4 (e.g. photographic film or an electronic image sensor). The imaging element is supported by a camera body (not shown). In a typical single-use camera, aperture stop 2 would not be adjustable in size and shutter 3 would have only one shutter speed. The objective lens 1, aperture stop 2, shutter 3 and imaging element 4 are all aligned relative to an optical axis 14.

An electrochromic filter 5 is located along optical path 14 between aperture stop 2 and lens 1. Electrochromic filter 5 is a coating that can be deposited on a variety of substrates including glass and plastic. A major property of the electrochromic filter is that its optical density changes as a voltage applied to the electrochromic filter changes: as the voltage increases, so too does the optical density of the electrochromic filter increase, and vice-versa. The electrochromic coating requires very little electrical power to operate, so all of the power needs can be supplied by the photovoltaic device, thereby eliminating the need for a battery. In a preferred embodiment, the electrochromic coating is applied to a thin, clear plastic sheet.

Figure 2:
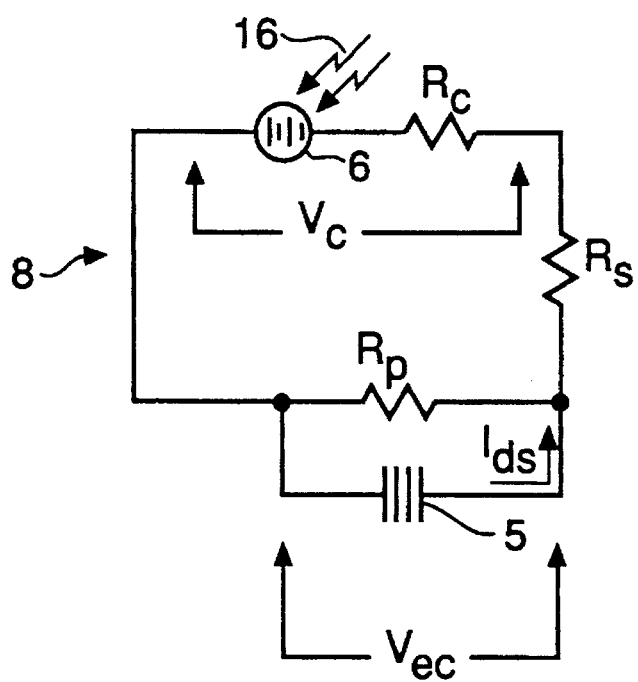
FIG. 2 is a control circuit including a photoelectric circuit.

Turning now to FIG. 2, a control circuit 8 includes a photovoltaic (photoelectric) element 6 which outputs a voltage $V_c$ the value of which depends on the brightness of the visible light 16 which is incident on photovoltaic element 6: the brighter the light the higher the voltage and vice-versa. A typical photovoltaic element produces about 0.5 volts at 0.5 milliamps under nominal lighting conditions. A group of eight photovoltaic elements connected in the proper combination of parallel and series can produce about 2.0 volts at 1.0 milliamps. Photovoltaic element 6 has an effective series resistance $R_c$ associated with it.

Particular to every electrochromic filter 5 is a maximum working voltage. Exceeding this maximum working voltage will degrade the electrochromic filter. To prevent such degradation, a series resistor $R_s$ is provided in circuit 8. Because electrochromic filters behave like a rechargeable battery, once the electrochromic filter has changed state (e.g. from relatively clear to relatively dark, corresponding to going from a scene with low brightness to a scene with high brightness), time is needed to revert to the clear state when in a low scene brightness condition. The main factor effecting the amount of time it takes for the electrochromic filter to revert to the clear state is the internal leakage current $I_{ds}$ of the electrochromic filter. To speed up changing states from dark to clear, a parallel resistor $R_p$ is used to bleed off excessive charge from the electrochromic filter.

For an electrochromic device that has a maximum input voltage $V_{ec}$ of 1.75 volts and a photovoltaic element maximum voltage of 2.0 volts, and assuming a 0.2 ma discharge current $I_{ds}$, the following can be calculated:

$$R_P = V_C/I_{ds} = 2.0V/0.2ma = 10 \text{ kilohms}$$

and $$R_C + R_S = ((V_C/V_{EC}) - 1) \times R_P$$
$$= ((2.0/1.75) - 1) \times 10 \text{ kilohms} = 1.4 \text{ kilohms}$$

The value of resistor $R_p$ is chosen to be high enough to force electrical current through electrochromic filter 5 yet low enough to allow the optical density of electrochromic filter 5 to change with sufficient speed as light conditions change.

Referring to FIGS. 1 and 2, in operation, during very bright scene conditions (e.g. outdoors on a sunny day), photovoltaic element 6 puts out a relatively high voltage, causing the optical density of electrochromic filter 5 to become relatively high. As a result, a relatively large percent of the scene light is blocked by electrochromic filter 5 from proceeding towards imaging element 4. During poorly lit scene conditions (e.g. outdoors at night), photovoltaic element 6 puts out a relatively low voltage, causing the optical density of electrochromic filter 5 to become relatively low. As a result, a relatively small percent of the scene light is blocked by electrochromic filter 5 from proceeding towards imaging element 4.

Preferably, the system parameters are selected such that (1) when the scene is of average brightness (part way between a sunny day outdoors at noon and a poorly lit night scene), the optical density of electrochromic filter 5 is at a mid-level value and (2) when the optical density of electrochromic filter 5 is at a mid-level value, the amount of scene light passed by electrochromic filter 5 is sufficient to expose imaging element 4 to the middle of its exposure curve. As such, the maximum exposure latitude for the system will be obtained.

Figure 3:
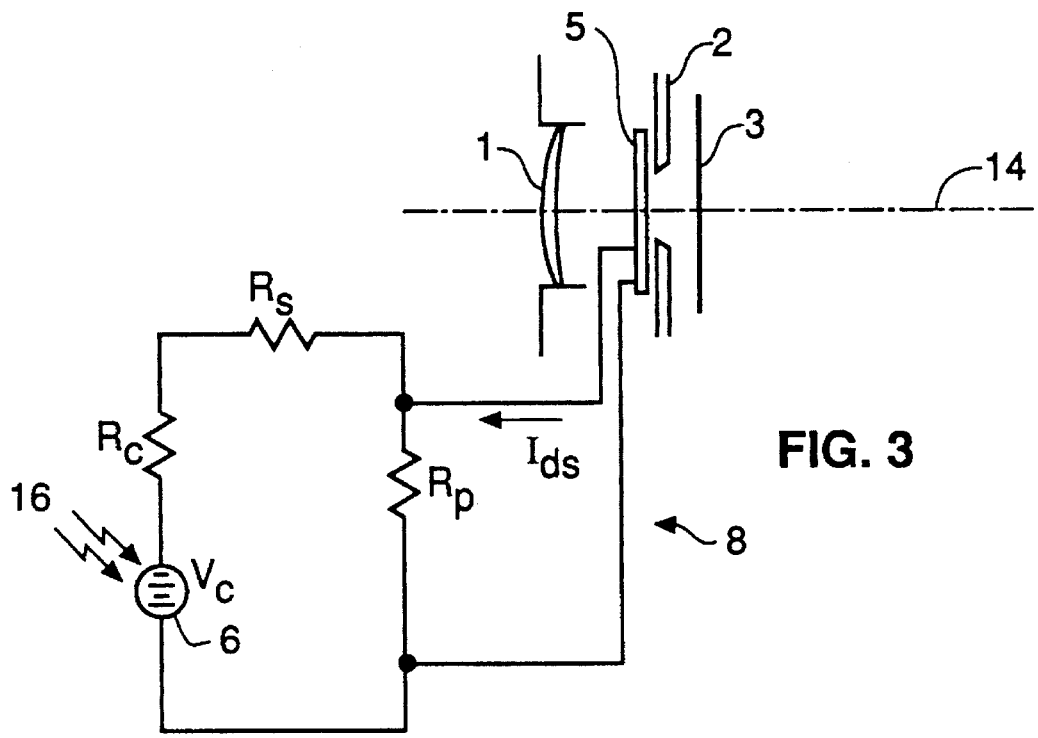
FIG. 3 is a side schematic view of the camera of FIG. 1 incorporating the control circuit of FIG. 2 in an open loop arrangement.
Figure 4:
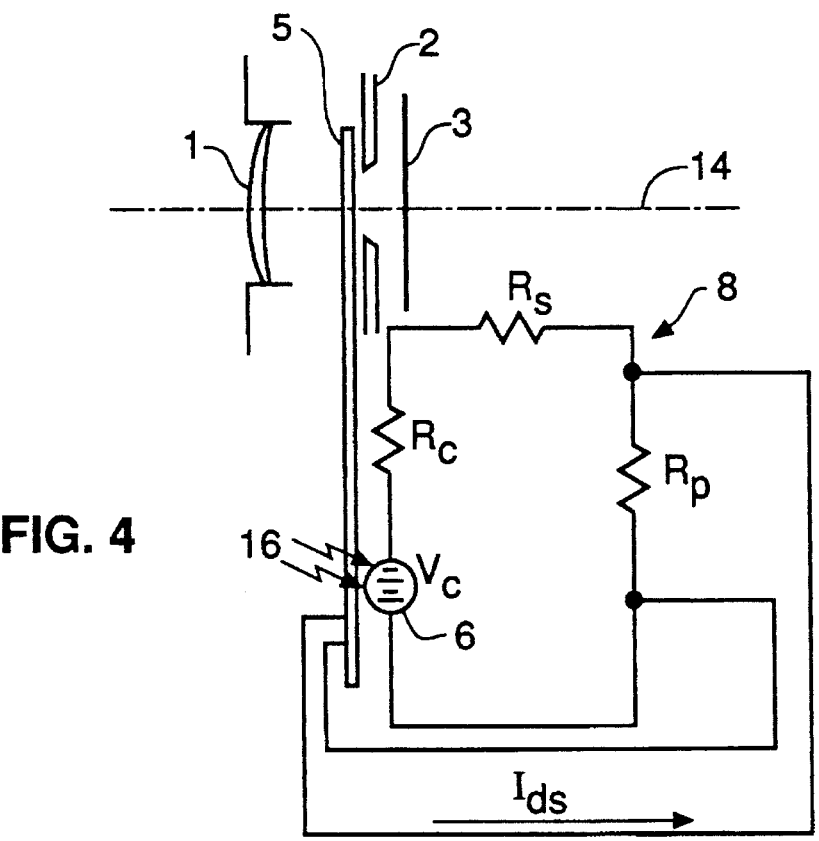
FIG. 4 is a side schematic view of the camera of FIG. 1 incorporating the control circuit of FIG. 2 in an closed loop arrangement.

Referring to FIGS. 3 and 4, an open loop and closed loop embodiment of the invention will be described. In the FIG. 3 embodiment, an open loop arrangement is shown in which photovoltaic element 6 views the scene directly. As such, the voltage output of photovoltaic element 6 will vary with variations in scene light 16, and the optical density of electrochromic filter 5 will be adjusted according to scene brightness without any feedback to photovoltaic element 6. FIG. 4 represents a closed loop embodiment in which photovoltaic element 6 is located behind electrochromic filter 5, thereby viewing the scene through the filter. In such a closed loop system, the photovoltaic element 6 receives feedback from electrochromic filter 5.

The invention has been described with reference to a preferred embodiment. However, it will be appreciated that variations and modifications can be effected by a person of ordinary skill in the art without departing from the scope of the invention.

PARTS LIST 1 objective lens
2 aperture stop
3 shutter
4 imaging element
5 electrochromic filter
6 photovoltaic element
8 circuit
10 camera
12 camera body
14 optical axis
16 scene light

We claim:

1. A camera comprising means for supporting an imaging element for recording a scene, and an electrochromic filter disposed between the scene and the imaging element, is characterized by:

a photoelectric element which emits a electrical energy the value of which depends on an amount of scene light which is incident on the photoelectric element, at least a portion of said electrical energy emitted by the photovoltaic element being used to directly control the optical density of said electrochromic filter, thereby controlling the amount of scene light which reaches the imaging element.

2. The camera of claim 1, further comprising:

a resistor in series with said photoelectric element for preventing said electrochromic filter from receiving more than a maximum working voltage.

3. The camera of claim 1, further comprising:

a resistor in parallel with said electrochromic filter for enhancing the rate of change of the optical density of said electrochromic filter.

4. The camera of claim 1, wherein said photoelectric element is located such that scene light passes through said electrochromic filter before becoming incident on said photoelectric element, thereby providing feedback to said photoelectric element.

* * * * *